United States Patent [19]

Gubler

[11] 3,909,462

[45] Sept. 30, 1975

[54] NOVEL ODORANT AND/OR FLAVORANT
[75] Inventor: Bernhard Gubler, Pfaffikon, Switzerland
[73] Assignee: Givaudan Corporation, Clifton, N.J.
[22] Filed: Sept. 1, 1972
[21] Appl. No.: 285,689

[30] Foreign Application Priority Data
Sept. 6, 1971   Switzerland...................... 13017/71

[52] U.S. Cl. ............................. 260/562 R; 426/538
[51] Int. Cl.² ....................................... C07C 103/32
[58] Field of Search ................................ 260/562 R

[56] References Cited
OTHER PUBLICATIONS

Sidgwick, The Organic Chemistry of Nitrogen; Clarendon Press – Oxford (1966), pp. 224–225.

Primary Examiner—C. Davis
Attorney, Agent, or Firm—Thomas Cifelli, Jr.

[57] ABSTRACT

The preparation and use of the novel N-phenyl-N-methyl-2-ethyl-butyric acid amide is disclosed.

1 Claim, No Drawings

NOVEL ODORANT AND/OR FLAVORANT

FIELD OF THE INVENTION

This invention relates to the field of fragrances and flavors, and more especially to odorant compositions, foodstuffs and drinks.

DESCRIPTION OF THE PRIOR ART

Dimethyl-2-ethyl-butyric acid amide has been disclosed as having a peppermint note, and has been suggested for use as an odorant and flavorant.

SUMMARY OF THE INVENTION

The present invention relates to a novel odorant and/or flavorant. More particularly, the invention is concerned with a novel acid amide and a process for the manufacture thereof. The invention is also concerned with odorant compositions and foodstuffs, delicacies and/or aromatizing agents containing said acid amide as well as with a method of imparting an odor to materials or an aroma to foodstuffs and/or delicacies by means of said acid amide.

The novel acid amide provided by the present invention is N-phenyl-N-methyl-2-ethyl-butyric acid amide of the formula

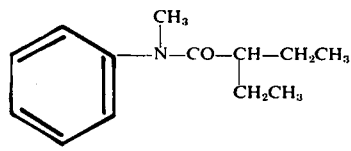

According to the process provided by the present invention, the acid amide of formula I hereinbefore is manufactured by reacting 2-ethylbutyric acid or a reactive derivative thereof with N-methylaniline.

DESCRIPTION OF THE PREFERRED EMBODIMENTS

The reaction between 2-ethylbutyric acid or a reactive derivative thereof and N-methylaniline can be carried out according to methods known per se for the manufacture of amides [see, for example, Organikum, org. chem. Grundpraktikum, 9th Auflage (1970), VEB deutscher Verlag der Wissenschaften].

Examples of reactive derivatives of 2-ethylbutyric acid which can be used in the present process are the acid halides (e.g. the chloride or the bromide), the acid anhydride and the lower alkyl esters (e.g. the methyl or ethyl ester).

Preferably, the acid amide of formula I is manufactured by reacting 2-ethylbutyric acid chloride with N-methylaniline.

The acid amide of formula I provided by the present invention possesses particular aroma and odorant properties, especially an interesting grapefruit note. It can accordingly be used for aromatizing foodstuffs and delicacies as well as drinks. It can also be used as an odorant for the manufacture of odorant compositions such as perfumes, or for perfuming technical or cosmetic products of all kinds (e.g. solid and liquid detergents, synthetic washing agents, aerosols, soaps, creams and lotions). The acid amide can be used in perfumery on the basis of its herby note. It is especially suitable in the manufacture of perfume bases having lavender-like and cologne notes. The fragrance characteristic of such bases is modified in an advantageous manner by the addition of the acid amide of formula I. The content in odorant compositions (bases) can vary within wide limits; for example, between about 1 and about 25 wt.%, preferably between about 2 and about 5 wt.%. In the finished products, it can amount to ca 1–2% (of a base). For perfuming technical products (e.g. solid and liquid detergents, synthetic washing agents, aerosols or cosmetic products of all kinds such as soaps), there can, in general, be employed ca 0.1–0.3% (in the case of washing agents) or 0.8–2% (in the case of soaps) of such bases.

The flavor of the acid amide of formula I can be denoted as powerful, green-fruity, minimally woody and amazingly similar to the flavor of freshly squeezed grapefruit juice. It is also slightly astringent, which is likewise true for the flavor of the grapefruit juice. The acid amide can accordingly find use in the manufacture of certain fruit aromas, especially in the manufacture of grapefruit aromas.

Grapefruit aromas may be produced in the usual manner by means of cold-pressed peel oil of grapefruit. Such oil is thereupon added to the drinks to be aromatized (e.g. lemonades) in amounts of, for example, 0.5–5% (wt.). If there is added to the peel oil 0.1–10% (wt.), preferably 0.5–5% (wt.), of the acid amide of formula I, the drinks aromatized with such an oil display a substantially better, more fruity flavor. However, the acid amide of formula I can also itself convey the typical natural grapefruit flavor and, consequently, may be used per se for this purpose, i.e., without the aforesaid peel oil.

If the acid amide of formula I is to be used as a component for the manufacture of aromas, these aromas can be formulated, for example, as liquids, pastes or powders. The products can, for example, be spray-dried, vacuum dried or lyophilised.

The formulation of such artificial aromas as well as the aromatizing of foodstuffs or delicacies and drinks can be carried out in a manner known per se; see, for example, J. Merory, Food flavorings, composition, manufacture and use; Avi Publ. Co. Inc., Westport 1968.

The acid amide of formula I can be used for the production of grapefruit aromas in foodstuffs (e.g. yoghurt etc.), in delicacies (e.g. confectionery products such as bon-bons, soft ice, etc.) and in drinks (e.g. mineral waters and syrups).

The following Examples illustrate the present invention, it being understood that they are not limitative thereof.

Example 1 illustrates the process of this invention.

EXAMPLE 1

In a four-necked flask provided with a stirrer, condenser, dropping funnel and thermometer, 635 g of N-methylaniline are mixed with 1.32 litres of aboslute benzene and 395 g of 2-ethylbutyric acid chloride are added dropwise to this mixture over a period of 1 hour. In so doing, the temperature rises to 70°C. The reaction mixture is stirred for a further 2 hours at 60°C (oil bath) and thereupon allowed to cool to room temperature. 500 ml of distilled water are added with cooling and the aqueous layer is separated off in a separating funnel. The benzene layer is washed three times with 200 ml of 10% sulphuric acid each time and then with bicarbonate solution and water. The benzene is evaporated off and the residue is subjected to column distillation. There are thus obtained 500 g of N-phenyl-N-methyl-2-ethylbutyric acid amide (yield 83%); boiling point 98°C/0.3 mmHg; $n_D^{20} = 1.5100$.

Examples 2, 3 and 4 illustrate typical odorant and aroma compositions containing the acid amide provided by the invention:

EXAMPLE 2

An odorant composition (cologne type) can contain the following ingredients:

| | parts by weight |
|---|---|
| acid amide of formula I | 50 |
| undecylenaldehyde 1% (A) | 5 |
| ylang-ylang absolu | 5 |
| verveine French | 5 |
| rose oil Moroccan | 5 |
| α-irone | 5 |
| cinnamic acid methyl ester | 5 |
| methyl naphthyl ketone cryst. | 5 |
| rosemary oil French | 10 |
| camomile oil sweet 10% (A) | 10 |
| anthranilic acid methyl ester 10% (A) | 10 |
| resinoid benzoic Siam | 10 |
| lavender oil Bareme | 25 |
| neroli oil | 125 |

| —Continued | Parts by weight |
|---|---|
| orange oil Guinea | 125 |
| lemon oil Messina | 100 |
| bergamotte oil Reggio | 450 |
| nerolidol | 50 |
| | 1000 |

(A) phthalic acid diethyl ester

The addition of the acid amide of formula I imparts to the lavender composition a more pronounced and more powerful character, which is very desirable in such compositions.

EXAMPLE 3

The addition of 5 wt.% of the composition described in Example 2 to a usual commercial lavender perfume softens its oppressive sweet notes in a pleasant manner.

EXAMPLE 4

The addition of 10 ppm of N-phenyl-N-methyl-2-ethylbutyric acid amide to 12% sugar syrup gives a drink which has a good grapefruit flavor.

What is claimed is:

1. N-Phenyl-N-methyl-2-ethylbutyric acid amide.

\* \* \* \* \*